Sept. 30, 1952 W. LEWIS, JR., ET AL 2,612,270
TWO-STAGE FILTER

Filed Feb. 12, 1951 2 SHEETS—SHEET 1

INVENTOR.
W. Lewis, Jr.
L. T. Clifton
BY
C. M. McKnight
ATTORNEY

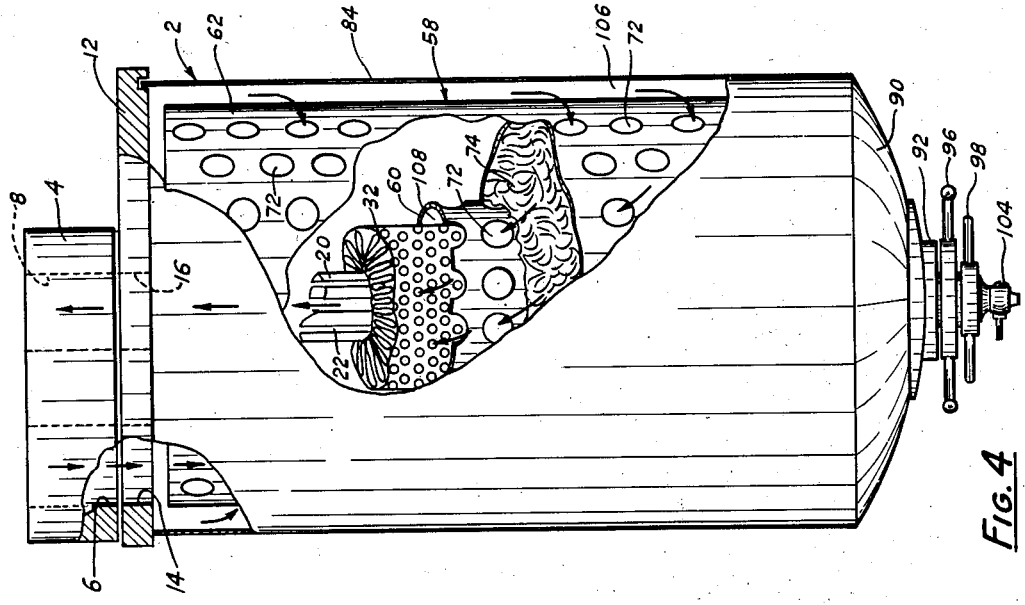
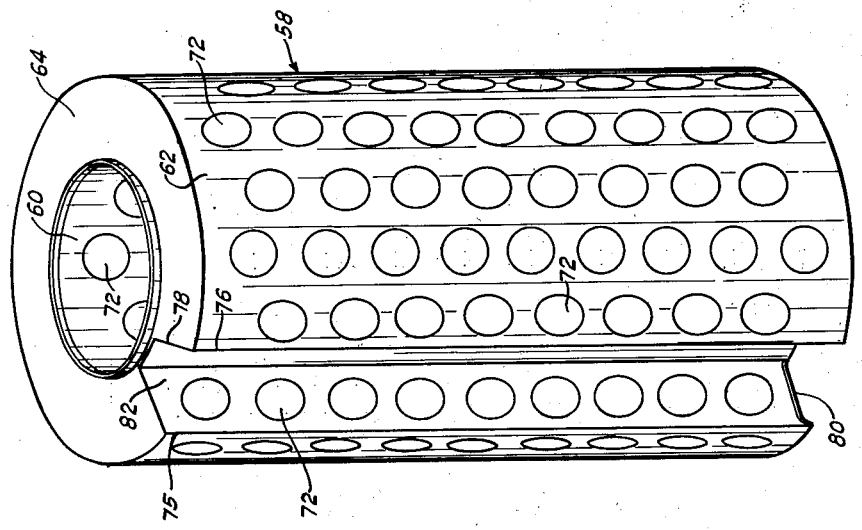

Patented Sept. 30, 1952

2,612,270

UNITED STATES PATENT OFFICE 2,612,270

TWO-STAGE FILTER

Warner Lewis, Jr., and Lloyd T. Clifton, Tulsa, Okla., assignors to Warner Lewis Company, Tulsa, Okla., a corporation of Delaware Application February 12, 1951, Serial No. 210,525

3 Claims. (Cl. 210—131)

This invention relates to improvements in filtering devices, and more particularly, but not by way of limitation, to an improved filter employing two filtering steps or operations.

The usual filter utilized to filter light hydrocarbons such as high octane gasoline or jet fuels, normally employs only a surface type filtering medium. Therefore, particularly when the filtering device is utilized on the fuel lines of aircraft, ice crystals and large contaminants soon cake on the outer surface of the filtering medium to preclude a substantial flow of fluid through the filtering medium and rendering the entire filtering device useless.

The present invention relates to a filtering device particularly adapted for filtering light hydrocarbons and employing two filtering operations. The hydrocarbon stream is first passed inwardly through a volume type filtering medium where ice crystals and large contaminants are removed from the stream. The stream is then passed through a surface type filtering medium before being discharged from the filtering device, to remove the finer contaminants. A volume type filtering medium, as it is well known, will absorb or remove a large quantity of contaminants before passage of fluid therethrough is materially restricted. Therefore, the present filtering device will have a substantially longer service life than conventional filtering devices, and the efficient operation of the surface type filtering medium will not be impaired by a deposition of large contaminants thereon.

An important object of this invention is to provide a two stage filtering device.

Another object of this invention is to provide a filtering device which may be easily and efficiently broken down for inspection or repair without being disconnected from a fluid flow line.

A further object of this invention is to provide a filtering device whereby the filtering mediums thereof may be easily replaced.

A still further object of this invention is to provide an efficient filtering device having a long service life.

Another object of this invention is to provide a novel filtering device which may be economically manufactured.

Other objects and advantages of the invention will be evident from the following detailed description, read in conjunction with the accompanying drawings, which illustrate our invention.

In the drawings:

Figure 3 is a perspective view of the outer repack element.

Figure 4 is an elevational view of the filter with portions broken away for clarity.

Figure 1:
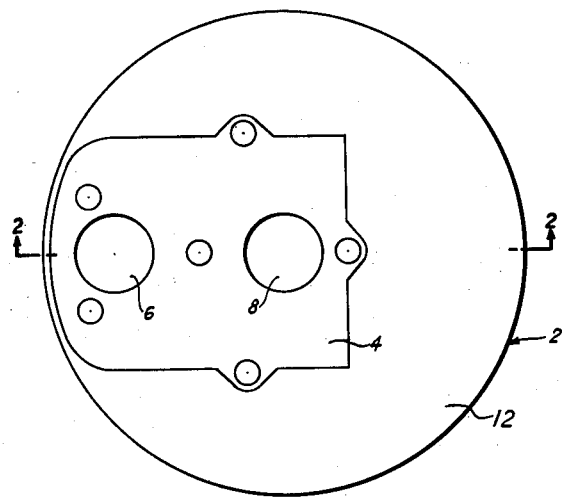
Figure 1 is a plan view of a novel filtering device.

Referring to the drawings in detail, reference character 2 generally indicates a novel filtering device comprising a relief valve 4 having an inlet passageway 6 and outlet passageway 8 therethrough. The passageways 6 and 8 are suitably interconnected by passageways (not shown) having spring loaded pistons (not shown) therein to provide a bypass of fluid directly from the inlet 6 to the outlet 8 in the usual manner when flow of fluid through the filter 2 is obstructed. Furthermore, the passageways 6 and 8 are internally threaded (not shown) or otherwise adapted for interconnection with a fluid flow line (not shown).

The relief valve 4 is secured to the upper face 10 (Fig. 2) of a circular shaped head plate 12. Apertures 14 and 16 are provided through the plate 12 in aligned relation with the passageways 6 and 8 respectively. The upper end 18 of a center tube 20 is secured in the aperture 16. The tube 20 extends downwardly from the plate 12 and is provided with a plurality of slots 22 in the walls thereof for purposes as will be hereinafter set forth. A plug 24 is secured in the lower end 26 of the tube 20 to preclude flow of fluid downwardly out of the tube. A rod 30 is secured to the plug 24 and extends downwardly therefrom.

A tubular shaped filter element 32 is telescoped over the tube 20 and extends over substantially the entire length thereof to cover the slots 22. The filter element 32 is a surface type filter, being composed of resin impregnated paper or the like. An apertured circular shaped element 34, preferably formed out of cork or the like, is disposed on the upper end of the filter 32 and cooperates with a sharpened circumferential flange 36 provided on the lower face 38 of the head plate 12 to preclude flow of fluid down the walls of the tube 20 and hence bypassing the filter 32. An apertured circular plate 40 is also provided on the lower end of the filter 32. The plate 40 engages an upwardly extending and sharpened circumferential flange 42 provided on an apertured retaining plate 44. The retaining plate 44 is telescopically disposed on the tube 20 and is in turn sealed to the tube 20 by a sealing ring (not shown) to preclude fluid by-passing the filter 32 by flowing upwardly along the walls of the tube 20. A circumferential flange 48 depends from the plate 44 to receive the upper end of a helical compression spring 50. The opposite or lower end of the spring 50 is anchored in a circumferential groove 52 provided in another apertured retaining plate 54. A nut 56, threadedly secured on the rod 30, retains the plate 54 in the desired position, and the plate 54, through the medium of the spring 50 and plate 44 in turn retains the filter 32 in operating position on the tube 20.

An outer tubular filter unit or repack generally designated at 58 (see also Fig. 3) is telescopically disposed over the filter element 32. The repack 58 comprises an inner tube 60 and an outer tube 62 interconnected by upper and lower caps 64 and 66 respectively. The inner tube 60 extends slightly higher than the outer tube 62 and has its upper end sealed in a circumferential groove 68 provided in the lower face 38 of the head plate 12. The lower end of the inner tube 60 is sealed in a circumferential groove 70 provided in the lower retaining plate 54. The plate 54 retains the repack unit 58 in assembled relation over the filter 32. A plurality of apertures 72 are provided in the tubes 60 and 62 and the lower cap 66 to permit flow of fluid through the unit as will be more fully hereinafter set forth. A volume type filtering material 74, such as a product termed "Caslen," is packed in the filter unit 58 between the tubes 60 and 62 to filter fluid passing therethrough.

As clearly shown in Fig. 3, the outer tube 62 is bent inwardly at 75 and 76, and the caps 64 and 66 are cut away at 78 and 80 respectively to provide a vertical passageway 82. Referring again to Fig. 2, it will be noted that the passageway 82 is disposed in aligned relationship with the inlet passageway 6 and aperture 14.

A cylindrical housing 84 is disposed over the repack 58 and has its upper end 86 sealed in another circumferential groove 88 provided in the lower face 38 of the head plate 12. The lower end 90 of the housing 84 is enclosed and is provided with an apertured bushing 92 in the central portion thereof to receive the downwardly extending rod 30. A suitable sealing ring 94 is carried in the bushing 92 around the rod 30 to preclude leakage of fluid through the bushing 92. An apertured nut 96 is threadedly secured in the bushing 92 around the rod 30 for purposes as will be hereinafter set forth. A smaller apertured nut 98 is threadedly secured in a longitudinal bore 100 provided in the lower end of the rod 30. The nut 98 is threadedly secured in the bore 100 by means of left hand threads 99 for purposes as will be hereinafter set forth. The bore 100 communicates at its upper end with a transverse aperture 102 in turn communicating with the interior of the housing 84 to provide a drain passageway for the housing. A suitable pet cock 104 is threadedly secured in the nut 98 in communication with the bore 100 to control the draining of the filtering device 2 in a well known manner.

Operation

In operation, the hydro-carbon stream, or any other fluid to be filtered, is pumped through a fluid flow line (not shown) into the passageway 6. The fluid will then flow downwardly through the aperture 14 and the vertical passageway 82, as shown by the arrows in Fig. 4. From Figs. 2 and 4 it will be noted that an annular chamber 106 is provided between the walls of the housing 84 and the outer tube 62 of the repack 58. Therefore, the fluid may flow into and through the repack 58 from around the entire outer surface thereof, providing the maximum filtering area.

As the fluid passes through the filtering medium 74 of the repack 58, the larger contaminants and ice crystals are removed from the fluid and retained in the filtering medium. Since the filtering medium 74 is a volume type, the maximum contaminants may be entrained therein before the flow of fluid therethrough is obstructed. From the repack 58, the fluid flows into the annular chamber 108 between the inner tube 60 and the outer surface of the filter element 32. It will be noted that the upper and lower ends of the tube 60 are sealed off by the head plate 12 and the retaining plate 54 respectively, therefore the fluid is constrained to pass through the repack 58 in order to enter the chamber 108, and by-passing of the repack 58 is prohibited. Furthermore, the upper and lower ends of the filter element 32 are sealed as previously set forth, hence by-passing of the inner filter element 32 is also precluded.

The filter element 32, as previously set forth, is a surface type filtering element, therefore the finer or smaller contaminants contained in the fluid are deposited on the outer surface thereof. These smaller contaminants, will, of course, eventually form a cake or layer (not shown) on the outer surface of the filter 32 to reduce the flow of fluid through the filter. However, since the larger contaminants have previously been filtered out by the filtering medium 74, a cake will not be formed on the filter 32 until after many hours of operation.

After passing through the filter element 32, the fluid flows through the slots 22 into the center tube 20 and hence through the aperture 16 and outlet passageway 8 to any desired destination (not shown). In the event the repack 58 becomes substantially filled with large contaminants, or a cake is formed on the outer surface of the filter element 32, the differential pressure of the fluid between the inlet 6 and outlet 8 will be increased. Upon an increase of this differential pressure above a predetermined amount, the passageways (not shown) interconnecting the inlet 6 and outlet 8 will be opened in the usual manner to permit a bypassing of both the repack 58 and filter 32.

Figure 2:
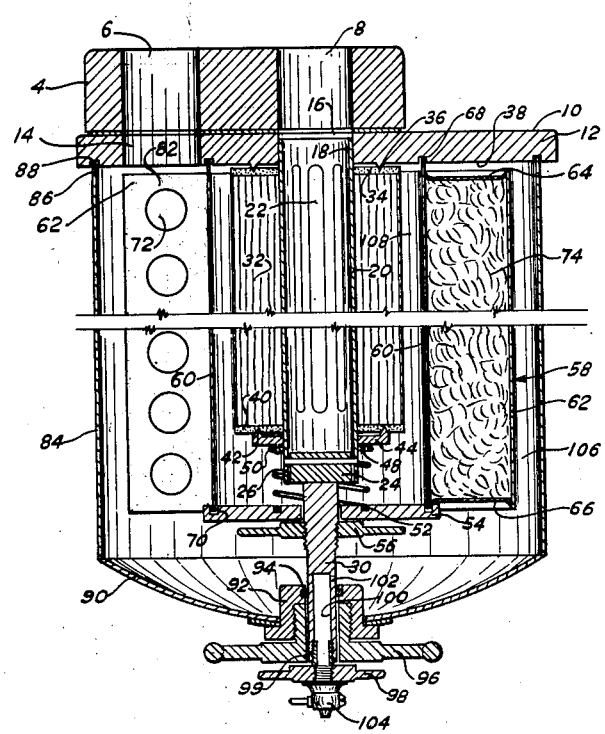
Figure 2 is a sectional view taken on lines 2—2 of Fig. 1.

To assemble the filtering device 2, the inner filter element 32 is first placed over the slotted center tube 20 with the upper sealing plate 34 thereof in engagement with the circumferential flange 36. The outer filter or repack 58 is then telescoped over the filter 32 with the upper end of the tube 60 seated in the circumferential groove 68 and the vertical groove 82 in alignment with the aperture 14. The sealing plate 44 and spring 50 are then placed over the tube 20 with the circumferential flange 42 in engagement with the bottom seal 40 of the filter 32. Next, the retaining plate 54 is placed over the rod 30 in engagement with the lower end of the tube 60 and the spring 50 as shown in Fig. 2. The nut 56 is then threaded onto the rod 30 in contact with the retaining plate 54. It will then be readily seen that the filter 32 and repack 58 are secured in operating position on the head plate 12 through the medium of the tube 20 and rod 30.

The shell or housing 84 may then be freely telescoped over the repack 58 with the upper end 86 thereof in the circumferential groove 88 of the head plate 12, and the bushing 92 over the lower end of the rod 30. The housing 84 is retained in sealing engagement with the head plate 12 by the nuts 96 and 98 through the medium of the rod 30 and center tube 20. The nut 96 is first secured tightly in the bushing 92 and the nut 98 is then threaded into the bore 100. The nut 96 is then backed off or turned in a counter-clockwise direction into contact with the lower nut 98. Since the rod 30 is rigidly secured to the head plate 12, and the nut 98 is secured by the left hand threads 99 in the rod 30, the counter-clockwise movement of the nut 96 will not loosen the nut 98. Furthermore, the reaction force exerted by the nut 96 on the bushing 92 will force the housing 84 against the head plate 12 to provide an efficient seal. Torsional forces exerted on the rod 30, and hence the center tube 20, will thereby be reduced to a minimum. The reduction of torsional forces is an important factor when the filtering device 2 is constructed out of light-weight materials, as when utilized to filter high octane gasoline or jet fuels in aircraft.

Lastly, in the assembling operation, the pet cock 104 is threadedly secured in the lower nut 98 and placed in a closed position to preclude flow of fluid out of the housing 84 through the aperture 102 and bore 100. To install the filtering device 2, it is simply necessary to thread the inlet and discharge fuel or fluid flow lines (not shown) in the apertures 6 and 8 respectively.

From the foregoing it is apparent that the present invention provides a novel filtering device employing two filtering steps. The stream to be filtered is first passed through a volume type filter to remove the larger contaminants and ice crystals, and then the stream is passed through a surface type filter to remove the smaller contaminants. It is also apparent that the filtering device may be easily and efficiently assembled or disassembled for inspection or repair without disconnecting the fluid flow lines. One or both of the filtering elements may be replaced in a minimum of time. Furthermore, the present invention provides a practical and efficient filtering device having a long service life and which may be economically manufactured.

Changes may be made in the combination and arrangement of parts as heretofore set forth in the specification and shown in the drawings, it being understood that any modification in the precise embodiment of the invention may be made within the scope of the following claims without departing from the spirit of the invention.

We claim:

1. In a filtering device comprising a head plate, inlet and outlet apertures in the head plate, a tube secured in the outlet aperture and extending downwardly therefrom, a plurality of slots in the tube, a surface type filter element telescoped over the tube and covering the slots, sealing plates for sealing the upper and lower ends of the surface type filter element to the tube, a volume type filter element telescoped over the surface type filter element, the upper end of said volume type filter being sealed to the head plate, means for sealing the lower end of the volume type filter to the tube, and a housing secured to the head plate around the volume type filter providing a passageway from the inlet aperture to the volume type filter.

2. In a filtering device comprising a head plate, inlet and outlet apertures in the head plate, a slotted tube secured in the outlet aperture and extending downwardly from the head plate, a plug in the lower end of the slotted tube, a rod secured to the plug and extending downwardly therefrom, a surface type filter element surrounding the slotted tube, means for sealing the opposite ends of said filter element to the tube and supporting said filter element on the tube, a tubular repack unit telescoped over the filter element, the inner bore of said repack being sealed at its upper end to the head plate, a retaining plate carried on said rod for supporting the repack and sealing the lower end of the repack inner bore, a volume type filtering medium in the repack, a housing telescoped over the repack, and means on said rod for retaining the housing in sealing contact with the head plate, said housing providing a passageway communicating with the inlet aperture and the outer surface of the repack.

3. In a filtering device comprising a head plate, inlet and outlet apertures in the head plate, a slotted tube secured in the outlet aperture and extending downwardly from the head plate, a plug in the lower end of the slotted tube, a rod secured to the plug and extending downwardly therefrom, a surface type filter element surrounding the slotted tube, means for sealing the opposite ends of said filter element to the tube and supporting said filter element on the tube, a tubular repack unit telescoped over the filter element, said repack comprising a perforated inner tube and outer tube, caps for securing the opposite ends of the outer tube to the inner tube, means for sealing the upper end of the inner tube to the head plate, a retaining plate carried on said rod for supporting the repack and sealing the lower end of the repack inner tube, a volume type filtering medium in the repack, a housing telescoped over the repack, and means on said rod for retaining the housing in sealing contact with the head plate, said housing providing a passageway communicating with the inlet aperture and the outer surface of the repack.

WARNER LEWIS JR.
LLOYD T. CLIFTON.

REFERENCES CITED

The following references are of record in the file of this patent:

UNITED STATES PATENTS

| Number | Name | Date |
| --- | --- | --- |
| 410,767 | Pierce | Sept. 10, 1889 |
| 1,563,904 | Kerckhoff et al. | Dec. 1, 1925 |
| 1,624,832 | Glover | Apr. 12, 1927 |
| 1,999,913 | Merritt | Apr. 30, 1935 |
| 2,431,782 | Walton et al. | Dec. 2, 1947 |
| 2,550,853 | Nugent | May 1, 1951 |

FOREIGN PATENTS

| Number | Country | Date |
| --- | --- | --- |
| 8,374 of 1910 | Great Britain | Apr. 6, 1911 |